No. 657,349. Patented Sept. 4, 1900.
C. M. JONES.
WORM GEARING.
(Application filed Aug. 28, 1899.)
(No Model.)
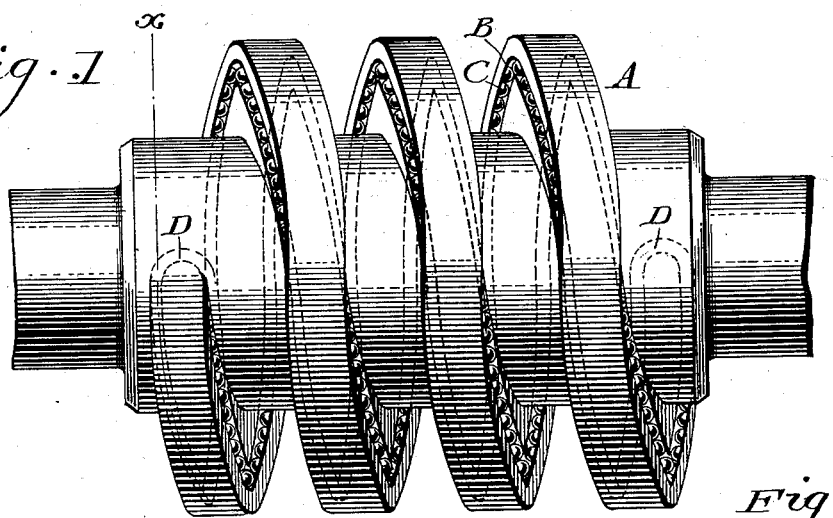
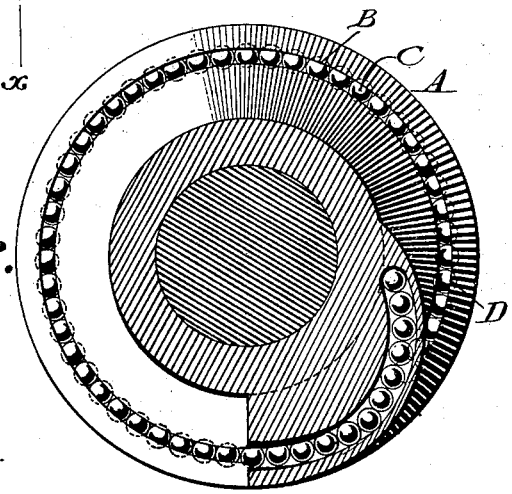
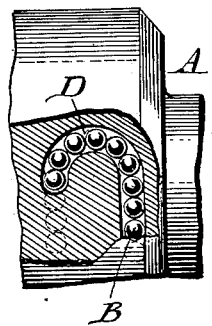
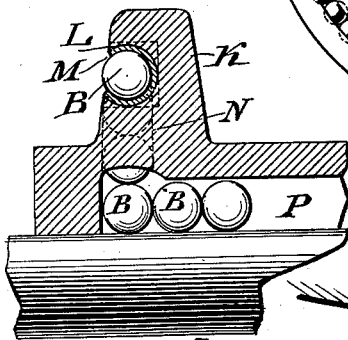
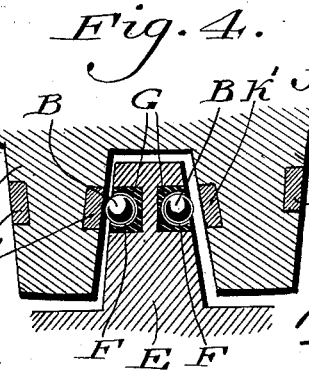

UNITED STATES PATENT OFFICE.

CHARLES M. JONES, OF PHILADELPHIA, PENNSYLVANIA.

WORM-GEARING.

SPECIFICATION forming part of Letters Patent No. 657,349, dated September 4, 1900.

Application filed August 28, 1899. Serial No. 728,671. (No model.)

*To all whom it may concern:*

Be it known that I, CHARLES M. JONES, a citizen of the United States, residing in the city and county of Philadelphia, State of Pennsylvania, have invented a new and useful Improvement in Worm-Gearing, which improvement is fully set forth in the following specification and the accompanying drawings.

My invention relates to improvements in worm-gearing; and it consists of novel means for eliminating or reducing to a minimum the greater part of the friction of worm-gearing by the employment of devices whereby a rolling contact is provided in place of the rubbing contact of ordinary worm-gearing.

In carrying out my invention I provide the worm with a continuous groove or score formed in its driving or pitch faces, said groove being adapted for the reception and retention of balls and allowing the latter to travel freely along the usual pitch-line of the worm during the revolution of the latter, said balls bearing against the teeth of the meshing wheel, and thus replacing the usual rubbing contact with their lesser rolling friction, each ball traveling along its groove from the first point of contact between the worm and wheel to the last point, after which by means of a suitable channel the balls pass through and travel back to the starting-point, thus continuing traveling from one extremity of the worm to the other.

My invention further consists of novel details of construction, all as will be hereinafter fully set forth, and particularly pointed out in the claim.

Figure 1 represents a perspective view of a worm embodying my invention. Fig. 2 represents a section on line x x, Fig. 1. Fig. 3 represents a detached or broken view of a portion of Fig. 1, showing especially the channel whereby the return of the antifriction-balls is effected. Fig. 4 represents a sectional view of a portion of a worm and its meshing wheel, having my invention applied thereto. Fig. 5 represents a sectional view of another embodiment of my invention.

Similar letters of reference indicate corresponding parts in the figures.

Referring to the drawings, A designates a worm-thread having on each of the opposite sides of the convolutions thereof the continuous channel or groove C, in which are located the traveling balls or similar antifriction devices B, said groove being continuous, as will be understood from Fig. 1, and being located at either side of the worm-thread, the grooves or channels being in practice preferably continued to join each other through the extensions or return-channels D, which continue from the end convolutions at a point near the tapered ends thereof into the material of the hub, so that the walls of the channels are uniform and regular through the convolutions and hub and the strength of the end channels is preserved near said tapered ends, while the hub material is utilized for directing the balls from one side channel to the other, as best seen in Figs. 1 and 3.

In Fig. 4, E designates a tooth of the worm, the latter having on either side thereof the channel F, formed of suitable material G, seated in said tooth, said channels containing the balls B, which latter are adapted to contact with the contiguous portions of the teeth H of the gear J.

In the construction seen in Fig. 5, K designates a worm which is provided with the channel M, formed in the material L, said channel containing the balls B and being continued, as indicated in dotted lines, through the recess P, whereby the balls are conveyed to the desired point, as is evident.

If desired, the teeth of the gear-wheel may have wearing-strips of hardened steel or other material fastened to them to take up the wear of the balls, as indicated at K' in Fig. 4.

It will be seen from the foregoing that by my invention the balls bear against the teeth of the worm-wheel with a rolling friction which is very much less than the usual rubbing friction and that as the worm revolves each ball travels along its groove from the first to the last point of contact, and then by means of the reverse channel the balls pass through and are forced along the groove in the back or idle side of the worm back to the starting-point, thus traveling from one extremity of the worm to the other continuously while the worm revolves.

The shape of the teeth of the worm and wheel will usually differ somewhat from that adopted in ordinary gearing, the proper shape being designed and laid out in the usual manner for each particular case, and I do not, therefore, desire to be limited to the exact constructions or details which I have herein shown and described.

It will further be evident that the principle of my invention is applicable to cams and similar devices.

Having thus described my invention, what I claim as new, and desire to secure by Letters Patent, is—

A worm provided with continuous channels in opposite sides of the convolutions thereof and return-channels passing from one side to the other in the end convolutions near the terminals thereof, and antifriction devices in said channels.

CHARLES M. JONES.

Witnesses:
JOHN A. WIEDERSHEIM,
E. HAYWARD FAIRBANKS.